A. K. MOERING.
ROTARY CUTTER FOR PLASTER OF PARIS BANDAGES.
APPLICATION FILED MAY 18, 1917.
1,316,252. Patented Sept. 16, 1919.
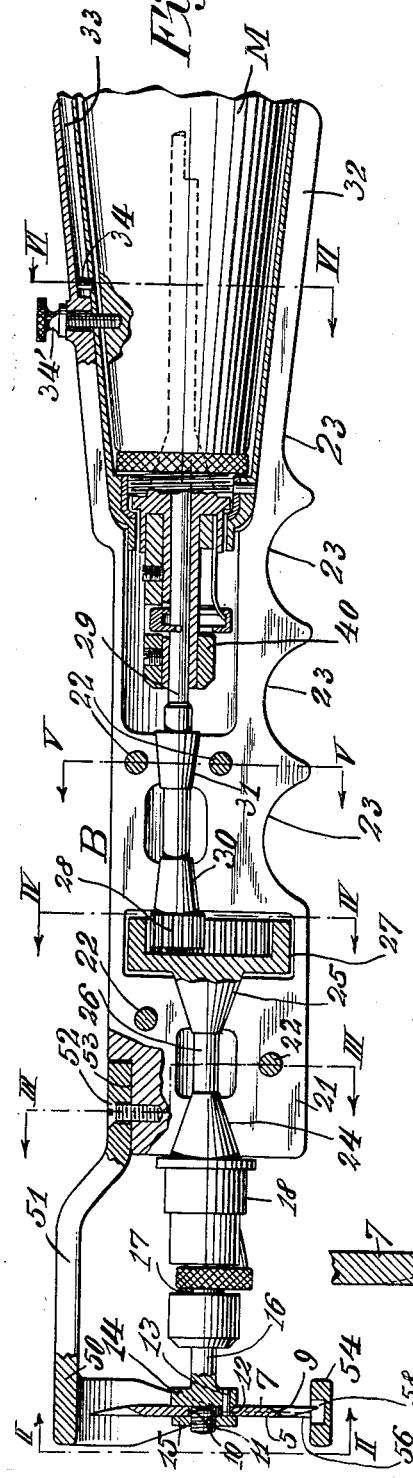
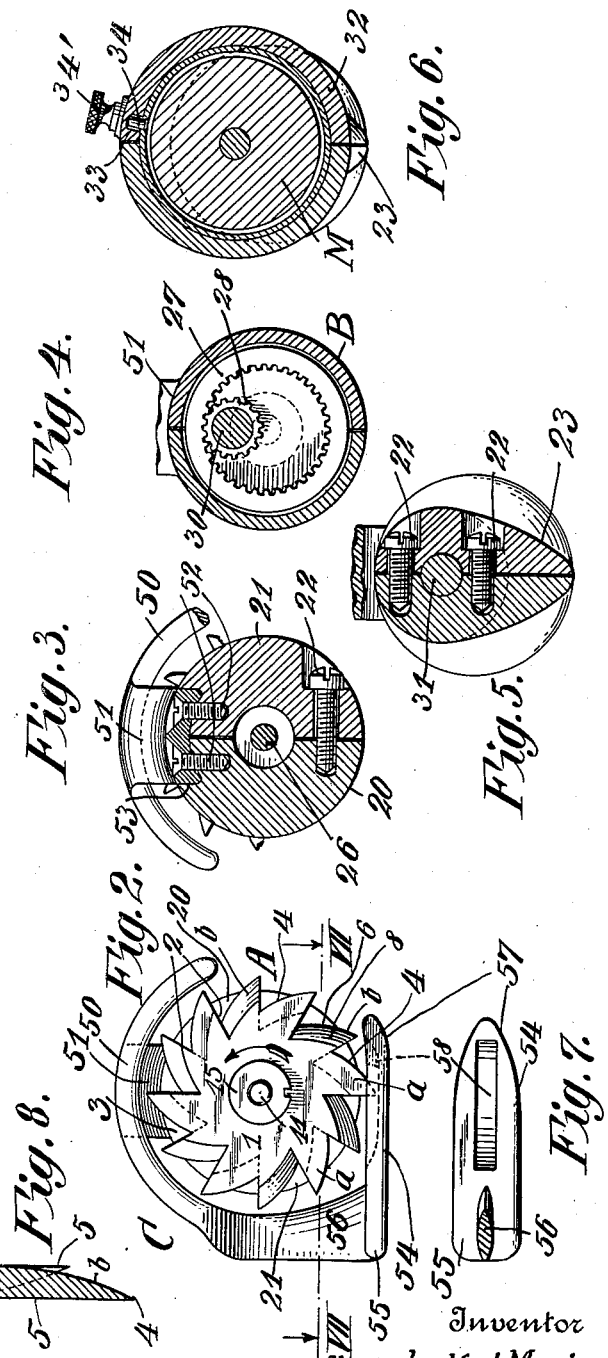
Inventor
Alexander Karl Moering
By his Attorney

UNITED STATES PATENT OFFICE.

ALEXANDER KARL MOERING, OF NEWARK, NEW JERSEY, ASSIGNOR TO THE KNY-SCHEERER CORPORATION, A CORPORATION OF NEW YORK.

ROTARY CUTTER FOR PLASTER-OF-PARIS BANDAGES.

1,316,252.         Specification of Letters Patent.     Patented Sept. 16, 1919.

Application filed May 18, 1917. Serial No. 169,603.

*To all whom it may concern:*

Be it known that I, ALEXANDER KARL MOERING, a citizen of the United States, and a resident of Newark, in the county of Essex and State of New Jersey, have invented certain new and useful Improvements in Rotary Cutters for Plaster-of-Paris Bandages, set forth in the following specification.

In modern surgery mutilated limbs are most effectively dressed by a bandage which holds the mutilated parts in proper position. This is most often accomplished through the medium of a bandage built up in a manner not dissimilar to reinforced concrete through the medium of plaster of Paris in which gauze dressing forms the portion next to the human flesh and serves as a reinforcement throughout the body of the plaster. When the plaster of such a bandage has set, the resultant structure is very strong. The very strength of such structure, which is useful in holding the mutilated parts in proper position, would be a detriment to this mode of dressing when the time for the removal of the bandage came, unless proper tools for the ready removal of the bandage, without injuring or discomforting the patient, were available.

Heretofore saws and shearing tools of various types have been employed but they have proven unsatisfactory in that the compound structure of the plaster and gauze bandage both clogs the teeth of the saw and shearing tool and grips the same to prevent its operation.

A further disadvantage in connection with rotary saws heretofore employed has been the direction of movement of their operating face has been such as to tend to feed the saw into the bandage, that is, the operating portion of the saw has moved customarily in a direction opposite to the progress of the saw through the bandage thereby tending to jam the bandage between the saw and its underlying guard-foot.

The object of the present invention is to devise a cutting tool capable of cutting through combined plaster of Paris and gauze bandages with convenience and despatch and without any discomfort to the patient.

The object of the invention are furthered by devising a rotary tool, the operative elements of which are cutting knives, not saw teeth, and the slicing edges of which demark the extreme lateral extent of said tool, the cutting edges of the blades alternating from one side to the opposite side so that no wedging action takes place with the operation of the tool and a swath is cut out of the plaster bandage as the tool progresses, while the material actually cut out is discharged from the cutting tool without clogging and without striking the operator by reason of a protecting hood laterally overhanging the cutting tool and covering a space peripherally extensive above the same.

A further important object of the invention is to make possible the cutting of plaster and gauze bandages through the medium of a rotary tool driven by a portable motor. Heretofore all the devices for the purpose of cutting bandages have been hand-operated. It is believed that either the feature of causing a rotary tool to rotate at uniform speed so that its operating portion moves forward in the direction of progress of the coöperating guard-foot, or the employment of slicing knives which alternate from side to opposite side of the tool and demark the extreme lateral extent of the same is alone sufficient to make the driving by means of a motor such as an electric motor feasible, but to attain the full advantage both this special type of cutter and the unique forward movement of the operating portion of the cutter should be employed. That is, it is believed that an ordinary saw or the toothed cutters of the prior art, if caused to have the forward movement at uniform speed for the operating portion, could be motor-driven with some degree of satisfaction and also that a cutter of this special type, regardless of the direction of movement of its operating portion, could be motor driven with some degree of satisfaction.

The above and further objects of the invention will better be understood by reference to the accompanying claims, which should be read in connection with the illustrative embodiment of the invention shown in the accompanying drawings which form a part hereof, in which like characters designate corresponding parts in the various figures and to which the following specifications is directed.

In the drawings Figure 1 is a horizontal section with parts shown in elevation and with parts broken away showing an illustrative embodiment of the invention; Fig. 2 is an end elevation in a plane through the line II—II of Fig. 1; Fig. 3 is a vertical section through staggered planes corresponding to line III—III of Fig. 1; Fig. 4 is a vertical section through the line IV—IV of Fig. 1 showing parts in elevation; Fig. 5 is a vertical section through line V—V of Fig. 1, showing parts in elevation; Fig. 6 is a vertical section through line VI—VI of Fig. 1 showing parts in elevation; Fig. 7 is a horizontal section through line VII—VII of Fig. 2, with parts removed; and Fig. 8 is a vertical section through the cutting tool, drawn to an enlarged scale and with parts broken away.

The cutting tool A comprises a circular body portion 1 of sheet steel, from which project peripherally a number of cutting blades $a$, $b$, each cutting blade having a radially extending terminal wall 2, extending cross-wise of the blank from which the blades are cut and forming no operating part of the cutting tool, but useful to leave an open space 3 which serves to aid the shedding of severed material. Each cutting blade $a$ has a curved slicing edge 4 lying in the plane 5, being the left-hand bounding plane of the tool, as viewed in Figs. 1 to 8, while each of the cutting blades $b$ has a similar symmetrically positioned (with respect to the medium plane of the cutting tool) curved slicing edge 6, lying in the opposite bounding plane 7 of the cutting tool. These slicing edges, although in the preferred embodiment lying in parallel planes, need of necessity merely demark the lateral extent of the tool. In other words, no part of the tool should extend sidewise farther than the cutting edges. It should be noted that each cutting edge extends outwardly and rearwardly or tangentially rearwardly relatively to the direction of rotation of the cutter. It is desired that all avoidance of teeth or hooking projections be had. A beveled face 8 extends across and inwardly from the cutting edge 6 in the plane 7 to the plane 5 of the cutting tool and in a similar manner a symmetrically beveled face 9, for each cutting blade, extends across from the edge 4 in plane 5 inwardly to plane 7. These cutting edges 4 and 6 are not radial, but if the curve of each were extended inwardly, it would pass decidedly to one side of the center of the body portion 1.

Each body portion 1 has a central perforation 10 adapted to take over the tool holder of the chuck spindle 11, and it may also have a second perforation 12, within which the drive pin 13 may engage. The drive pin 13 projects outwardly from the tool holder 14 and the cutting tool may be screwed home by the nut 15. In the embodiment illustrated, the spindle 16 is means for rotating the cutting tool A in the direction of the arrow indicated in Fig. 2, that is, in the direction of the operative progress of the cutting tool when it is serving to cut a bandage. The spindle 16 may extend to the right in the form of an integral shank 17, suitable for engagement in and disengagement from the chuck 18 which, in the embodiment illustrated, is of the type illustrated and described in the patent on surgical motor casing, No. 1,229,694, granted June 12, 1917, to William A. Winter. This chuck 18 is associated with suitable power connections, so that the same may readily be operatively driven.

In the embodiment illustrated, a casing B comprising two substantially symmetrical parts 20 and 21, arranged to be secured one to the other in any suitable manner, as by screws 22, provides a convenient hand-grip 23, externally and internally the suitable bearings and housing for the driving spindles, shafts and gears. The chuck 18 is carried by two opposed cone bearings 24 and 25, connected by the shaft 26, the parts terminating at the right in an internal gear 27, which meshes with the pinion 28, driven from the shank 29 through the cone bearings 30 and 31. At the right a casing B flares into a conical structure 32, adapted to take over the chuck and bottleneck shell of a standard surgical motor, such as that described in the application referred to above. The channel 33 serves as a guide to the casing B by coöperation with the pin 34 forming a part of the standard motor, while the set screw 34 may serve to hold the casing B to the motor shell. The clutch mechanism 40 is a part of the standard motor equipment and is substantially identical with the clutch 18 referred to previously. The gears 27 and 28 serve to reduce the speed of the standard electric motor M approximately two to one.

An important element in combination with the cutting tool A is the guard C, which comprises a guard hood in the form of a ring section 50 encircling the top portion of the cutting tool A and which is supported from the casing B by a suitable arm 51, which may be secured to the casing B by screws 52, but preferably through the coöperation of the socket 53. The hood 50 preferably laterally overhangs the cutting tool a considerable amount on both sides. Below the ring 50 is a guard-foot 54, the heel 55 of which is secured to the ring 50 by the thin web 56, the thickness of which is preferably less than the thickness of the cutting tool A and which is preferably beveled at both front and rear. The toe 57 of the foot 54 is preferably slightly upturned and pointed, as this is the part which first is thrust between the bandage and the flesh of the patient. It should be noted that the construction of the guard permits operative action upon a bandage solely by thrusting the toe 4 under the bandage so that the bandage occupies a position under the spindle 16, the web 56 passing through the swath cut by the laterally separated slicing edges. It is likewise preferred to provide a clearance trough 58 in the upper face of the foot 54 and to position the foot so that the tips of the cutting blades *b* may penetrate into the trough 58. In other words, the foot 54 extends both below and above the extreme outer slicing edges of the cutter, but is entirely out of contact therewith and is in no sense a shearing member. The cutting blades operate on the principle of a scythe rather than on the principle of a true shear between two coöperating shearing edges. This coöperation between the sides of the trough 58 and the cutting blades makes it impossible for the cutting tool to pass by any portion of the bandage to be severed without actually severing it. The direction of rotation of the cutting tool is in the direction of the arrow, so that the operating cutting edges 4 and 6 are driven against the bandage to be cut, that is, in a direction from the heel of the foot 54 toward the toe of the foot. This tends to prevent the progress of the cutting tool forward, although the material of the bandage has been removed by the tool to permit its forward movement. This prevents over-feeding and the consequent binding during the operation of the tool. This selected direction of rotation for the cutting tool is the sole direction for its operative rotation on account of the fact that the motor constantly operates in one direction,—that is, the direction necessary to bring about the desired directional rotation of the cutting tool. It is to be understood that the driving mechanism is broadly considered to be nothing more than the spindle 16 and that I have illustrated the gearing and shafts for connection with a surgical motor merely as a satisfactory embodiment and adaptation of my cutting tool to one convenient source of power. I do not intend to exclude the embodiment of this cutting tool from hand manipulation or from manipulation through the medium of any convenient and suitable application of power. Nevertheless I consider the preferred embodiment to comprise an electric motor drive with the selected directional movement at uniform speed for the cutter so that the operating portions of the cutter move forward and, in addition, the special configuration of slicing cutting edges as described.

What I claim and what I desire to secure by United States Letters Patent is:

1. A portable machine for cutting plaster and gauze bandages comprising an electric motor; a spindle driven by said motor; a rotary cutter of substantial thickness, free from hooking portions, the operating portions of which consist solely of peripherally positioned slicing blades, the slicing edges of which alternate from side to opposite side of said cutter and curve tangentially rearwardly relatively to the direction of rotation of the cutter; a mounting for said cutter on the end of said spindle; a foot fixable relatively to said motor and extending both below and above the extreme outer slicing edges of said cutter but entirely out of contact therewith, all whereby a clear swath may be cut rapidly through a bandage with no danger of the cutter binding in the cut or being bound by threads of the gauze which are severed cleanly and the plaster crushed by the high speed slicing blades in contra-distinction to being sawn or sheared.

2. A portable machine for cutting plaster and gauze bandages comprising an electric motor; a spindle driven by said motor; a rotary cutter of substantial thickness, free from hooking portions, the operating portions of which consist solely of peripherally positioned slicing blades, the slicing edges of which alternate from side to opposite side of said cutter and curve tangentially rearwardly relatively to the direction of rotation of the cutter; a mounting for said cutter on the end of said spindle; a foot fixable relatively to said motor and extending both below and above the extreme outer slicing edges of said cutter but entirely out of contact therewith, the direction of rotation of said cutter being from the heel toward the toe of said foot to prevent overfeeding of the machine, all whereby a clear swath may be cut rapidly through a bandage with no danger of the cutter binding in the cut or being bound by threads of the gauze which are severed cleanly and the plaster crushed by the high-speed slicing blades in contra-distinction to being sawn or sheared.

3. A portable machine for cutting plaster and gauze bandages comprising an electric motor; a spindle driven by said motor; a rotary cutter of substantial thickness, free from hooking portions, the operating portions of which consist solely of peripherally positioned slicing blades, the slicing edges of which alternate from side to opposite side of said cutter and curve tangentially rearwardly relatively to the direction of rotation of the cutter; a mounting for said cutter on the end of said spindle; a foot underlying said cutter and having a trough materially wider than the thickness of said cutter into which said cutter penetrates; a web approximating the thickness of said cutter and occupying a rearward position in the plane of said cutter and supporting said foot; a top hood overlying said cutter and attached to said web; a supporting arm for said foot and hood overlying the axis of said cutter and fixable relatively to said motor, all whereby a clear swath may be cut rapidly through the bandage with no danger of the machine binding in the cut or the cutting tool being bound by the threads of the gauze, which are severed cleanly and the plaster crushed by the high-speed slicing blades in contra-distinction to being sawn or sheared.

4. A portable machine for cutting plaster and gauze bandages comprising a portable electric motor; a rotary cutting tool; driving means comprising a shaft operatively and detachably connecting said tool with said motor; a casing extending from said motor about said driving means, providing a bearing for said shaft near said tool and leaving one end of said shaft exposed; a guard detachably secured to the end of said casing, comprising an arm overlying said shaft, a foot under said tool, a connecting web at the rear of and approximating the thickness of said tool, and a hood overlying said tool and connected with said web; and a hand-grip formed as a part of said machine for aid in manipulating the same.

In witness whereof I have signed my name to this specification this 20th day of March, 1917.

ALEXANDER KARL MOERING.

Witness:
JOHN CONTRELL.